Dec. 18, 1956  R. J. GILSON  2,774,160
PERPETUAL CALENDARS
Filed Feb. 14, 1955  4 Sheets—Sheet 1
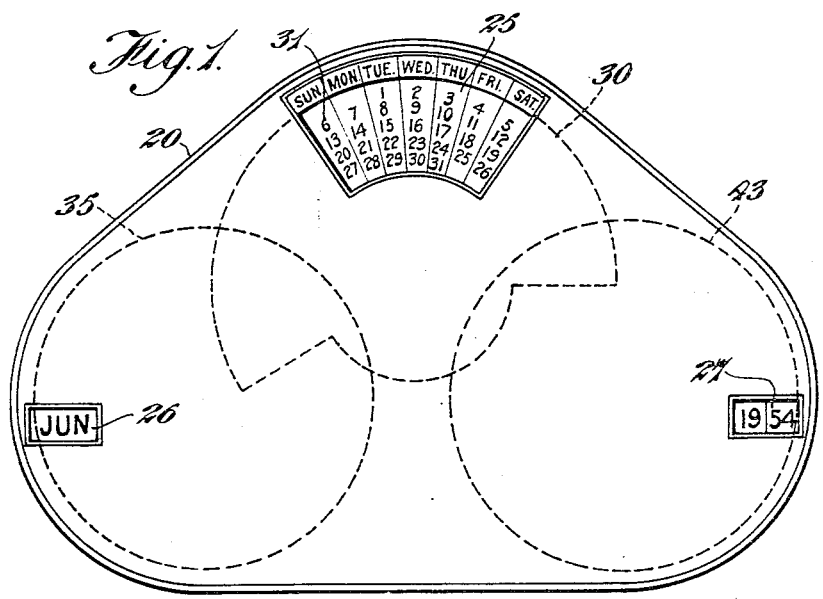
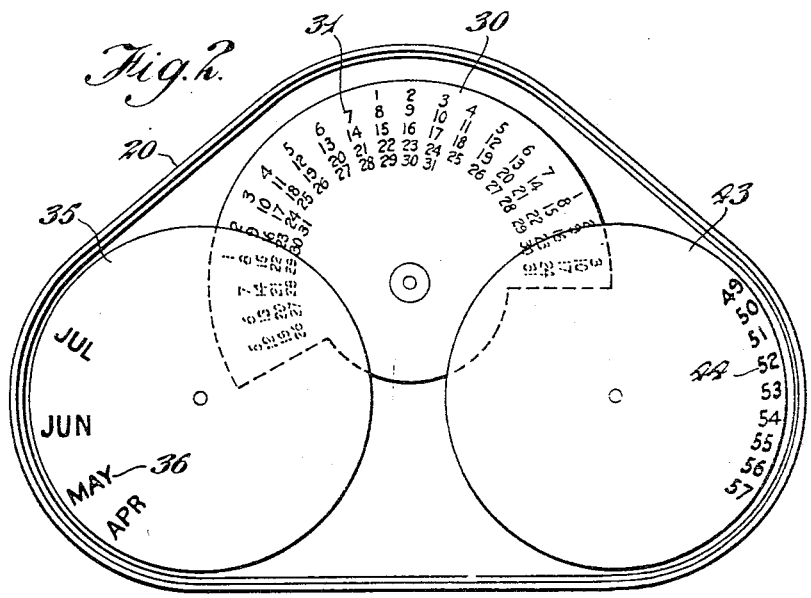
INVENTOR
ROBERT JOHN GILSON
By
ATTORNEY Dec. 18, 1956 R. J. GILSON 2,774,160
PERPETUAL CALENDARS
Filed Feb. 14, 1955 4 Sheets-Sheet 2
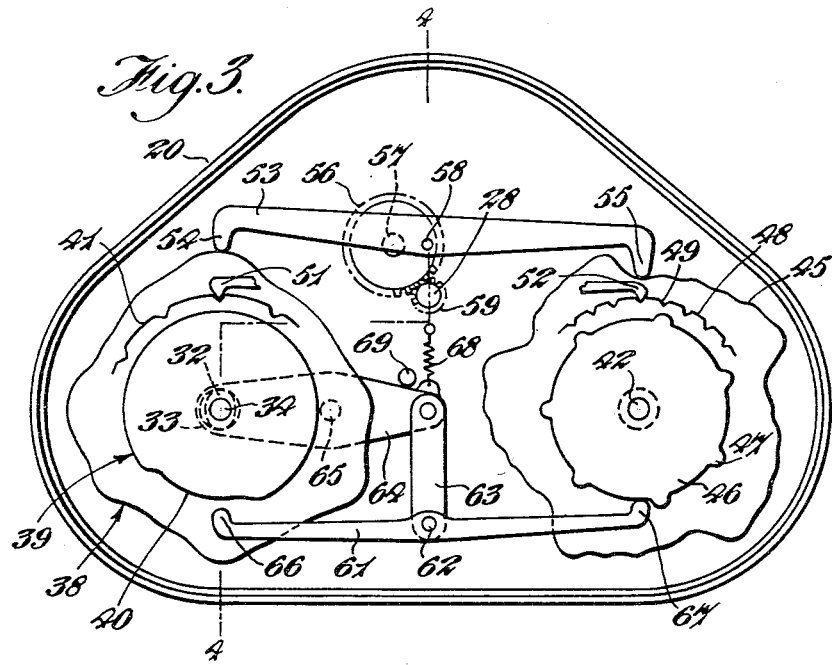
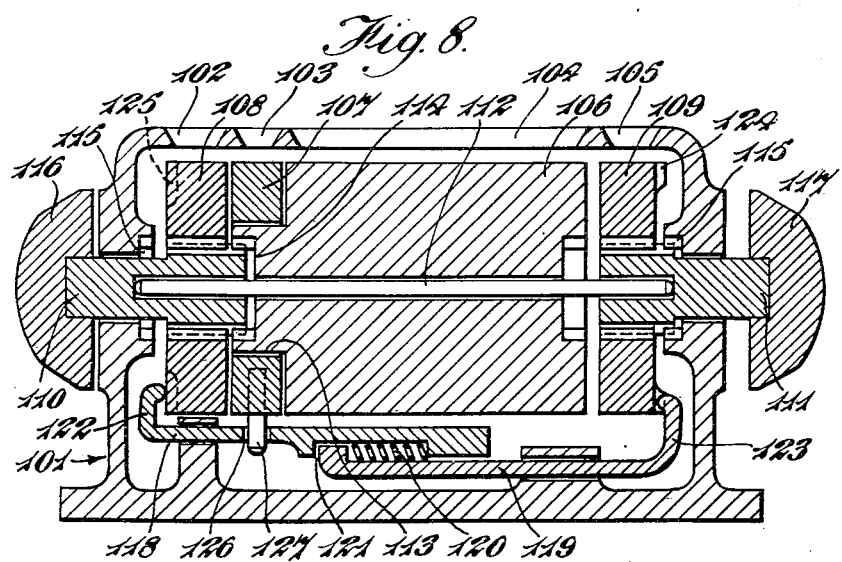
INVENTOR
ROBERT JOHN GILSON
By Maxwell E. Sparrow
ATTORNEY Dec. 18, 1956  R. J. GILSON  2,774,160
PERPETUAL CALENDARS
Filed Feb. 14, 1955  4 Sheets-Sheet 3
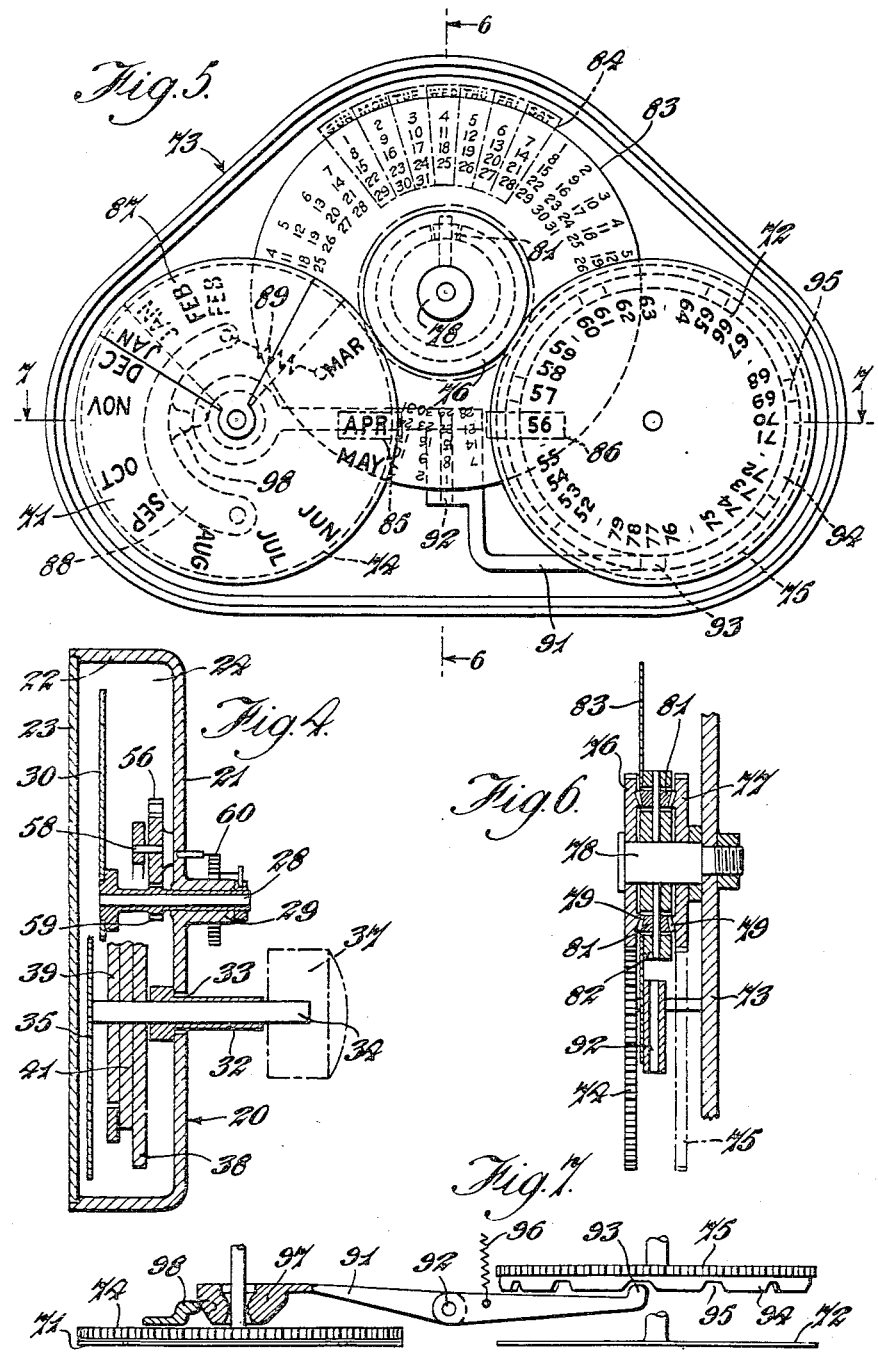
INVENTOR
ROBERT JOHN GILSON
ATTORNEY Dec. 18, 1956     R. J. GILSON     2,774,160
PERPETUAL CALENDARS
Filed Feb. 14, 1955     4 Sheets-Sheet 4
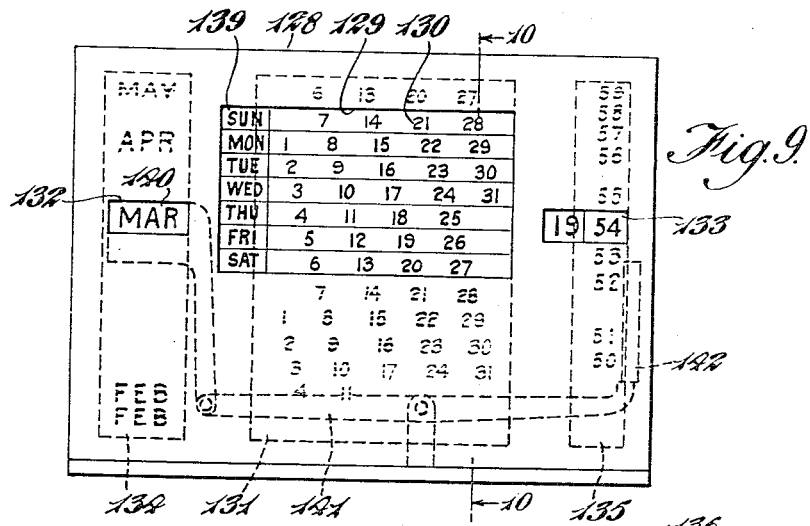
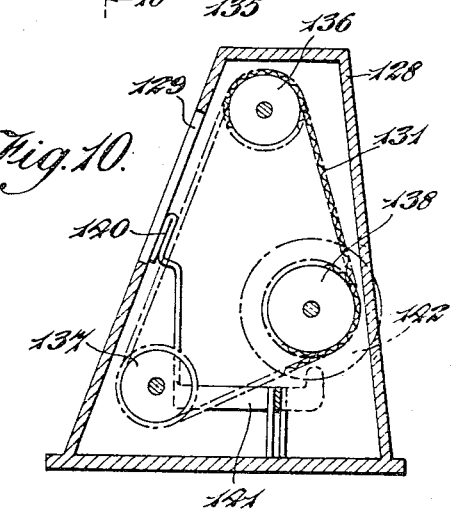
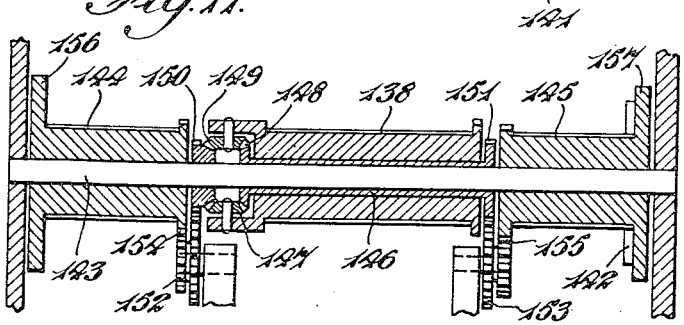
INVENTOR
ROBERT JOHN GILSON
ATTORNEY

United States Patent Office 2,774,160
Patented Dec. 18, 1956

2,774,160

PERPETUAL CALENDARS

Robert John Gilson, New Malden, England

Application February 14, 1955, Serial No. 487,959

Claims priority, application Great Britain June 11, 1954

9 Claims. (Cl. 40—112)

This invention relates to perpetual calendars, and has for its principal object to provide a calendar in which a scale of day-date figures is brought into correct relation with day-name headings for any month in any one of a number of years by the setting of separate year-number and month-name scales to show the desired year and month.

A perpetual calendar according to the invention comprises a reference member such as a casing having windows, pointers or the like to expose or indicate appropriate portions of three movable scales marked with year numbers, month names and day-date numbers respectively, the markings on the scales being so arranged, and movement of the year number scale and of the month-name scale being so transmitted to the day-date scale that movement of the year-number scale and the month-name scale to positions in which a selected month and year are exposed or indicated brings numbers on the day-date scale representing all the days of that month into correct register with day-name headings carried by the reference member.

The scales are preferably interconnected by mechanism such that movement of either the year-number scale or the month-name scale is transmitted to the day-date scale without movement of the other of said two first-mentioned scales.

The scales may be interconnected by differential gearing or by cam and lever mechanism.

In a modified form of perpetual calendar according to the invention the day-date scale is adapted to be driven through one releasable clutch means by the year-number scale and through another releasable clutch means by the month-name scale, means being provided to prevent rotation of each of said last-mentioned scales when the clutch means associated therewith are disengaged, and means being provided to ensure that only one of said clutch means is engaged at any one time.

Additional mechanism, operated in response to movement of the month-name and year-number scales to the appropriate positions, may act to modify the movement of one of the scales, or to displace a window, a pointer or the day-name headings, to compensate for the extra day in leap years.

The invention is hereinafter described with reference to the accompanying drawings, in which:

Figure 1 is a front elevation of one form of perpetual calendar according to the invention;

Figure 2 is an elevation similar to Figure 1 but with the front cover removed to show the scale markings;

Figure 3 is an elevation similar to Figure 2 but with the scales removed to show the interconnecting mechanism;

Figure 4 is a section on the line 4—4 of Figure 3;

Figure 5 is a view similar to Figure 2, showing a modified form of calendar according to the invention;

Figure 6 is a section on the line 6—6 of Figure 5;

Figure 7 is a sectional elevation, the section being taken on the line 7—7 of Figure 5;

Figure 8 shows, in section, another form of perpetual calendar according to the invention, in which the scales are carried by drums rotatable in a cylindrical casing and positive clutches are used to transmit rotation from the year-number and month-name scales to the day-date scale;

Figure 9 is a front elevation, and

Figure 10 a cross section, taken on the line 10—10 of Figure 9, of a form of perpetual calendar according to the invention, in which the scales are endless bands; and Figure 11 is a sectional elevation of one form of interconnecting mechanism for the bands of the calendar shown in Figures 9 and 10.

Referring to Figures 1 to 4, a housing or casing 20 having three straight sides joined by circular arcs comprises a back 21 integral with a peripheral rim 22, and a separate front 23 located in the rim 22 so as to enclose a space 24. The housing or casing may be moulded from thermoplastic or thermo-setting plastic material. The front 23 is formed with an arcuate window 25 and with two smaller rectangular windows 26 and 27, the names of the days of the week being marked around the outer edge of the window 25 as shown in Figure 1. A spindle 28, rotatable in a bearing 29 in the back 21 of the casing is concentric with the window 25, and carries a disc 30 on which are printed day-date numbers 31 in twenty radial columns as shown in Figure 2. It will be seen that the outermost figure in each column is 1, 2, 3, 4, 5, 6 or 7, the said figures following each other in a clockwise direction, and each other figure in each column is obtained by adding seven to the next outer figure in the same column, the highest figure being 31. Thus any seven adjacent columns contain all the figures from 1 to 31. The figures are arranged in spiral rows. A second bearing 32, slidable in a slot 33 in the back of the casing has rotatably mounted in it a spindle 34 on which is fixedly mounted a disc 35 bearing a scale of month names 36, as shown in Figure 2, the spindle 34 extending through the back of the casing and having fixed to it an operating knob 37. Fixedly mounted on the spindle inside the casing 20 are a cam 38 having a stepped profile, a cam 39 having a single notch 40, and a disc 41 having notches in its edge corresponding to the month name markings on the disc. A third bearing, similar to the bearing 32 but mounted in fixed relation to the back of the casing, has mounted in it a spindle 42 which, like the spindle 34, has an operating knob on its outer end, the spindle 42 carrying a disc 43 marked with year numbers at 44, a stepped cam 45, a second cam 46 having lobes 47 spaced apart by a distance corresponding to the spacing of leap years on the disc 43, and a disc 48 having notches 49 in its edge corresponding to the year number markings on the disc 43. Spring loaded pawls 51 and 52 co-operate with the discs 41 and 48 respectively to locate them accurately with month names and year numbers in register with the windows 26 and 27. A floating lever 53 is formed with cam followers 54 and 55 one at each end, the followers 54 and 55 engaging respectively with the cams 38 and 45, and the lever 53 is pivotally mounted on a gear wheel 56 rotating on a fixed pin 57 in the casing, the pivot 58 of the lever 53 being offset from the pin 57. The gear wheel 56 meshes with a pinion 59 fast with the spindle 28. It will be seen that rotation of either of the spindles 34 and 42 will cause the lever 53 to rock about its point of engagement with the cam 38 or 45 on the other of said spindles, thus turning the gear wheel 56 which in turn moves the spindle 28 to rotate the day-date scale disc 30. The lever 53 is urged into engagement with the cams 38 and 45 by a spiral spring 60 anchored at one end to the back 21, and at the other end to the spindle 28, the spring 60 acting, through the pinion 59, to apply a turning force to the gear wheel 56 in the appropriate direction.

The cams 39 and 46 co-operate with a second floating lever 61 pivotally mounted at 62 on a link 63 which is in turn pivotally connected to a rocking arm 64 pivoted at 65 in the casing and carrying the bearing 32 for the spindle 34. The lever 61 has cam followers 66 and 67 one at each end to co-operate respectively with the cams 39 and 46, and the lever 61 is urged, by a spring 68, towards a position, defined by a stop 69 engaged by the rocking arm 64, such that when the follower 67 engages the base circle of the cam 46, the follower 66 is at a radial distance from the centre of the cam 39 corresponding to the radius of the base circle of that cam. When the cam 46 is turned to a position in which a leap year number is exposed in the window 27, the cam follower 67 on the floating lever 61 is displaced, and, if the other follower 66 thereon is not opposite to the notch 40 in the cam 39 the spindle 34 is also displaced, thus transmitting additional movement through the lever 53 to the day-date scale. The depth of the notch 40 is such that, if that notch is opposite the cam follower 66, movement of the lever 61 due to the follower 67 engaging a lobe 47 of the cam 46 does not displace the spindle 34.

The cams 38 and 45 are so shaped, and are so set in relation to the month names and year numbers on the discs 35 and 43, that setting of the discs 35 and 43 to any desired month and year moves the disc 30 to a position in which the days of the month are brought into line with the correct day name headings in the window 25. The lobes 47 on the cam 46 are so placed that one of them is engaged by the cam follower 67 when any leap year number is shown in the window 27, and the notch 40 in the cam 39 is so positioned with relation to the month names on the disc 35 that it is opposite the follower 66 when either of the months January or February is shown in the window 26. Thus, when the calendar is set to any of the months from March to December in a leap year, the month name disc 35 and its spindle 34 are displaced from their normal position, and an additional movement of the disc 30 is produced to compensate for the extra day in that year.

The cam-and-lever mechanism shown is only one example of such mechanism which may be used, and means other than the gear and pinion may be employed to transmit the motion to the day-date scale disc. The additional movement of the day-date scale disc to compensate for the extra day in a leap year may be provided by movement of the spindle carrying the year-number scale disc instead of by movement of the spindle carrying the month-name scale disc. The leap-year compensation may be provided by displacement of a movable scale of day-name headings, the said scale, for example, being coupled to a rocking arm similar to the arm 64 and controlled by the cams 39, 46 and floating lever 61.

In the calendar shown in Figures 5 to 7, the scale-bearing discs are coupled one to another by differential gearing which, in the illustrated embodiment, is of the spur type, though friction gearing might be used instead. A month-name disc 71 and a year-number disc 72 are fixedly mounted on spindles suitably located in a casing 73, and each of the said spindles has fixed to it a spur wheel. These spur wheels are shown at 74 and 75 respectively, and they mesh respectively with two spur wheels 76 and 77 both freely rotatable on a spindle 78. The spur wheels 76 and 77 are each formed with a ring of bevel teeth 79, and both sets of bevel teeth 79 mesh with bevel pinions 81 mounted in a planet carrier 82 rotatable about the spindle 78 and carrying a day-date disc 83. The day-date disc 83 revolves behind a window 84 similar to the window 25 shown in Figure 1, the day-date figures being arranged in five overlapping spiral rows forming thirty-five radial columns. The markings on the month-name disc 71 and year-number disc 72 are viewed through windows 85 and 86 respectively. Adjacent year-numbers on the disc 72 are spaced apart by one thirty-fifth of a circle except in the case of leap-year numbers which are spaced from the preceding numbers by twice that distance, so that when moved from the position in which the preceding year is shown to the position in which a leap year is shown the disc 72 moves twice the normal distance. The month-names January and February are shown on a segment 87 movable through a small angle about the centre of the month-name disc 71. The arrangement of the month names on the disc 71 and segment 87 is as follows. Taking one-thirty-fifth of a circle as a basic unit, the spaces between the names on the disc are as follows:

March to April 3
April to May 2
May to June 3
June to July 2
July to August 3
August to September 3
September to October 2
October to November 3
November to December 2
December to March 12

The month names January and February are spaced apart by three units, and the angle of movement of the segment relative to the disc is such that the spacing between December and January may be one or two units, and the spacing between February and March 8 or 7 units. The segment 87 is coupled to a lever 88 pivotally mounted on the disc 71 and urged by a spring 89 to a position in which the month names on the segment 87 are in the correct relation to the remaining month names on the disc 71 for normal years. A lever 91, pivotally mounted at 92 in the casing carries a cam follower 93 engaging a face cam 94 rotating with the year-number disc 72, the cam 94 having notches 95 so positioned that the cam follower 93 drops into one of them, under the influence of a spring 96, whenever a leap-year number appears in the window 86. The other end of the lever 91 carries a frusto-conical member 97 co-operating with a projection 98 on the lever 88, the member 97 allowing the segment 87 normally to take up the position to which it is urged by the spring 89 but, when the follower 93 drops into a notch 95, the member 97 moves the lever 88 outwardly to displace the segment backwardly with respect to the disc 71 by an amount corresponding to the angular rotation of the said disc 71 necessary to move the numbers on the day-date disc from one day-name column to the next.

Thus rotation of the month-name and year-number discs to show any combination of month and year brings the correct day-date numbers for that month into register with the day names marked around the window 84, the displacement of the segment 87 for January and February of a leap year providing the necessary correction for the extra day in that year.

In the calendar shown in Figure 8, the scales are provided on drums rotably mounted in a cylindrical casing and are viewed through windows in the said casing. The casing is shown at 101 in Figure 8, and is formed with a longitudinal row of windows 102, 103, 104 and 105. A drum 106, viewed through the window 104, carries the day-date numbers in helical rows, the numbers being read in association with a day-name scale on a drum 107 visible through the window 103. The month name scale and year number scale are provided respectively on drums 108 and 109 viewed through the windows 102 and 105, the arrangement of the month names and year numbers on these drums being similar to their arrangement on the discs of the calendar described with reference to Figure 5, except that all the month names are inscribed directly on the drum, the spacing between December and January being two units. The drums 108 and 109 are splined internally to engage with splined shafts 110 and 111 respectively, the shafts being rotatable and slidable in bearings in the ends of the casing 101. The drum 106 is mounted on a rod 112 the ends of which are located in co-axial bores in the shafts 110 and 111. The drum 107 is mounted on a reduced end portion 113 of the drum 106. In each end of the drum 106 there is provided a recess 114 formed with splines about its circumferential wall, and similar recesses 115 are formed internally in the end walls of the casing. The splined portions of the shafts 110 and 111 each have a length greater than the thickness of the drums 108 and 109, and the rod 112 spaces the said shafts by such a distance that when the splined portion of either shaft extends into the adjacent recess 114 in the drum 106, the splined portion of the other shaft is clear of the other recess 114 and extends into the recess 115 at that end of the casing. Thus when one of the drums 108 and 109 is clutched to the drum 106, the other of said drums is held against rotation. Knobs 116 and 117 mounted respectively on the shafts 110 and 111 enable the said shafts to be readily manipulated.

The angular spacing of the splines on the shafts 110 and 111 is the same as the angular spacing of the rows of day-date numbers on the drum 106.

Two slide members 118 and 119, are urged inwardly one with respect to the other by a compression spring 120, their relative inward movement being limited by interengaging stop surfaces at 121. The slide members have offset ends 122 and 123 serving as cam followers engaging the outer end faces of the drums 108 and 109 respectively, the drum 109 having a plurality of cam lobes 124 on its outer end face to co-operate with the follower 123. The cam lobes 124 are so positioned that one of them is engaged by the follower 123 whenever a leap-year number appears in the window 105. The drum 108 is formed with two notches 125 so positioned that one of them is in a position to be entered by the follower 122 when the month of January is visible in the window 102, and the other is in a position to be entered by the said follower when the month of February is visible in the window 102. The slide member 118 is formed with an inclined slot 126 in which is engaged a pin 127 extending radially from the drum 107, so that longitudinal movement of the member 118 causes turning movement of the drum 107. When the follower 123 is in engagement with the face of the drum 109, the follower 122 just engages the face of the drum 108, and the drum 107 is in the correct position for the months other than January and February of a leap year, whereas, when the follower 123 is in engagement with a lobe 124 on the drum 109, and the follower 122 is pulled into a notch 125 on the drum 108, the day-name scale is moved forward one step to provide the correct indications for January and February of the leap year.

It will be understood that by pushing in either one of the knobs 116 and 117, and rotating the knob which has been pushed in, the drum 106 is rotated with the drum 108 or 109 associated with that knob, whilst the other of those two drums is held against rotation.

The calendar shown in Figures 9, 10 and 11 employs endless bands instead of the discs or drums shown in the previous arrangements, the bands being interconnected by any suitable mechanism, an example of which is shown in Figure 11. The calendar comprises a casing 128 having a window 129 in its front wall through which is visible a portion of a day-date number scale 130 on an endless band 131, and two smaller windows 132 and 133 in the same wall through which are visible respectively portions of a month name scale on an endless band 134 and of a year-number scale on an endless band 135. The endless bands 131, 134 and 135 are toothed or ribbed on their inner surfaces, and run over similarly toothed or ribbed rollers on spindles in the casing. Each endless band passes over upper and lower idle rollers and a driving roller, the idle rollers for the band 131 being shown at 136 and 137 in Figure 10, and the driving roller for that band at 138. The day-date numbers on the scale 130 are marked in inclined rows as shown in Figure 9 to co-operate with day-names marked at 139 on one side of the window 129, and the year numbers are marked in sequence on the band 135, a gap being left before each leap year. The month names are marked in sequence on the band 135, a gap being left before each leap year. The month names are marked at suitable intervals on the band 134, the months of January and February each being marked twice, in two different colours, so that there are two different positions of the band 134, corresponding to two different settings of the day-date scale 130, at which the month of January or February is in register with the window 132. A shutter 140, movable behind the window 132 has two transparent portions coloured respectively to match the colours of the duplicated month name markings, so that when one coloured portion of the shutter 140 is in register with the window 132 only the month name of the other colour can be seen, and the shutter 140 is controlled by a lever 141 operated by a cam 142 fast with the driving drum for the year number band, so as to maintain one coloured portion of the shutter 140 in register with the window 132 when the year-number band is set to a normal year, and the other coloured portion when the year-number band is set to a leap year. Thus the setting of the day-date scale for January or February of a leap year is adjusted to compensate for the extra day in that year. The month names of March to December are so coloured as to be visible through both portions of the shutter 140.

As shown in Figure 11, the driving roller 138 for the band 131 is rotatably mounted on a fixed spindle 143 between driving rollers 144 and 145 for the month-name band and the year-number band respectively, a sleeve 146 being interposed between the spindle 143 and the roller 138. One end of the roller 138 is recessed to provide a housing for a differential gear of which the planet pinions 147 are journalled on radial pins in said housing, one driving gear 148 is fast with the sleeve 146, and the other driving gear 149 is fast with a spur wheel 150. A second spur wheel 151 is fixed to the other end of the sleeve 146, and the spur wheels 150 and 151 are driven, through stepped idler pinions 152 and 153 respectively, by spur wheels 154 and 155 fast with the rollers 144 and 145 respectively. The rollers 144 and 145 are turned manually by means of discs 156 and 157 respectively, the edges of which project through slots in the back of the casing.

The gearing interconnecting the rollers 138, 144 and 145 may be modified, and means other than the discs 156 and 157 may be provided for rotating the rollers 144 and 145.

The driving rollers, instead of being connected by differential gearing, may be driven one from the other by positive clutch means corresponding to those described with reference to Figure 8, the driving rollers for the month-name and year-number bands being mounted on axially movable splined shafts adapted either to couple said rollers to the driving roller for the day-date band or to lock one or other of the said rollers to the casing when the other roller is being operated.

It will be understood that the reference member may be merely a panel on which the movable scales are supported, and that some or all of the scales, instead of being viewed through windows, may co-operate with pointers or the like indicators.

I claim:

1. A perpetual calendar comprising a reference member, three scales mounted movably on said reference member and marked respectively with year numbers, month names, and day-date numbers, means on said reference member to register with portions of said scales to be read for a given date indication, means for manually moving said year number scale, independent means for manually moving said month name scale, and mechanical transmission means connecting said year number scale and said month name scale to said day-date scale to effect movement of said day-date scale relative to either one of said year number and month name scales by movement of the other of said last named scales.

2. A perpetual calendar as claimed in claim 1, said mechanical transmission means comprising a differential gear mechanism including a first sun wheel, means connecting said first sun wheel to the year number scale for rotation with movement of said year number scale, a second sun wheel, means connecting said second sun wheel to the month name scale for rotation with movement of said month name scale, a planet carrier, planet wheels on said planet carrier engaging said sun wheels, and means connecting the day-date number scale to the planet carrier for rotation with movement of said day-date number scale.

3. A perpetual calendar as claimed in claim 1, including a first rotatable disc constituting the year number scale and a cam rotatable with said first disc, a second rotatable disc constituting said month name scale and a cam rotatable with said second disc, a floating lever engaging both said cams, and means operated by said floating lever to move said day-date number scale.

4. In a perpetual calendar as claimed in claim 1, three rotatable members constituting the year number scale, the month name scale and the day-date scale respectively, first releasable clutch means to connect the year number scale to the day-date scale, second releasable clutch means to connect the month name scale to the day-date scale, interconnecting means between said first and second clutch means to disengage either one when the other is engaged, and means for locking each of said year number and month name scales against rotation when the clutch means between the other of said scales and the day-date scale is engaged.

5. A perpetual calendar comprising a reference member, three scales mounted movably on said reference member and marked respectively with year numbers, month names and day-date numbers, means on said reference member to register with the portions of said scales to be read for a given date indication, means for manually moving said year number scale, independent means for manually moving said month name scale, mechanical transmission means connecting said year number scale and said month name scale to said day-date scale to effect movement of said day-date scale relative to either one of said year number and month name scales by movement of the other of said last-named scales, and means actuated by movement of the year number and month name scales to any one of a plurality of predetermined relative positions to modify the movement of the day-date scale effected by the mechanical transmission means.

6. A perpetual calendar comprising a reference member, three scales mounted movably on said reference member and marked respectively with year numbers, month names and day-date numbers, means on said reference member to register with the portions of said scales to be read for a given date indication, means for manually moving said year number scale, independent means for manually moving said month name scale, mechanical transmission means connecting said year number scale and said month name scale to said day-date scale to effect movement of said day-date scale relative to either one of said year number and month name scales by movement of the other of said last-named scales, a day name scale movable relative to said reference member, biassing means urging said day name scale to a predetermined position relative to said reference member, and means actuated by movement of the year number and month name scales to any one of a plurality of predetermined relative positions to move said day name scale to another predetermined position.

7. A perpetual calendar comprising a reference member, first and second discs mounted rotatably on said reference member and marked respectively with year numbers and day-date numbers, a third disc mounted rotatably on said reference member, a sector mounted for movement about the axis of said third disc, said third disc and sector being marked with month names, one of said third disc and sector bearing month names of January and February and the other of said disc and sector bearing the month names of March to December inclusive, means on said reference member to register with the portions of said discs bearing the year number, month name and day-date figure to be read for any given date indication, means for manually rotating the first disc, independent means for manually rotating the third disc, mechanical transmission means connecting said first and third discs to said second disc to effect movement of said second disc relative to either one of said first and second discs by movement of the other of said last named discs, biassing means urging said sector to one predetermined position relative to said third disc, and means actuated by movement of said first and third discs to any one of a plurality of predetermined relative positions to move said sector relative to said third disc to another predetermined position.

8. A perpetual calendar comprising a casing, three scales mounted movably in said casing and marked respectively with year numbers, month names and day-date figures, windows in said casing to expose the portions of said scales to be read for a given date indication, means outside said casing for manually moving said year number scale, independent means outside said casing for manually moving said month name scale, and mechanical transmission means connecting said year number scale and said month name scale to said day-date scale to effect movement of said day-date scale relative to either one of said year number and month name scales by movement of the other of said last-named scales.

9. A perpetual calendar comprising a casing, three scales mounted movably in said casing and marked respectively with year numbers, month names and day-date figures, windows in said casing to expose the portions of said scales to be read for a given date indication, means outside said casing for manually moving said year number scale, independent means outside said casing for manually moving said month name scale, mechanical transmission means connecting said year number scale and said month name scale to said day-date scale to effect movement of said day-date scale relative to either one of said year number and month name scales by movement of the other of said last-named scales, a transparent shutter co-operating with the window exposing a portion of the month-name scale, two portions of different colours on said shutter, means operated by said year number scale to selectively position the shutter with one coloured portion thereof covering the said window when a leap year number is in the window exposing part of the year number scale and with the other coloured portion thereof covering the window exposing a portion of the month name scale when a non-leap year number is in the window exposing part of the year number scale, the January and February month names on the month name scale being duplicated one of each in the same colour as one portion of the shutter and the other of each in the same colour as the other portion of the shutter so that only one is visible with the shutter in either position.

References Cited in the file of this patent
UNITED STATES PATENTS

| | | |
|---|---|---|
| 1,607,703 | Skinner et al. | Nov. 23, 1926 |
| 2,146,981 | Paulin | Feb. 14, 1939 |